United States Patent Office 3,250,665
Patented May 10, 1966

3,250,665
PROCESS OF MODIFYING A PAPER WEB WITH EPOXY RESINS BY ADDITION OF POLYALKYL-ACRYLAMIDE DEGRADATION PRODUCT IN FORMATION OF THE PAPER
Jerome M. Gess, Swarthmore, Pa., assignor to Scott Paper Company, Philadelphia, Pa., a corporation of Pennsylvania
No Drawing. Filed Aug. 19, 1963, Ser. No. 303,129
7 Claims. (Cl. 162—168)

This invention pertains to cellulose materials, more specifically, this invention involves cellulose-containing sheet material which has been improved by chemical modifications.

A problem in the chemical modification of the prior art cellulose materials has been the improvement of some cellulose properties without sacrificing others. A particular problem has been the improvement of some cellulose sheet properties, such as dimensional stability, with little, if any, improvement in other desired properties such as tear strength. The reason for absence of a prior art paper sheet having balanced properties has probably been due to lack of understanding on how to effect proper bonding of the cellulose fibers, chemical cross-linking and the type of cross-linking needed to get the desired results.

The proposed theory, which may illustrate the present invention, is as follows: The fibers of the cellulose in a sheet material lie in a roughly parallel and generally planar configuration. The novel method supplements the hydrogen bonding or affinity of one parallel strand to the other by first introducing an active hydrogen into the cellulose molecule by means of specific and particular compounds and then bridging the strands chemically with a compound of specific properties. The compound introducing the active hydrogen is necessary in order to tie down the ends of the bridge linking the cellulose molecules. The properly tailored bridge is a difunctional resin compound of superior flexibility and balance of properties as represented herein by the improved characteristics of the sheet.

Notwithstanding any theory, the invention in this case is predicated on improved properties and the unexpected results.

The invention is accomplished by a process modifying the cellulose material which comprises the steps of adding to a wet pulp furnish a polyacrylamide degradation product containing carboxylic acid (in its salt form) and amine groups; forming a sheet from the modified pulp furnish; adding a high molecular weight epoxy resin to the formed sheet; and drying the sheet, thereby obtaining an improved cellulose material. The pulp furnish contains di and/or polyvalent positive ions such as $Al^{+++}$, $Fe^{+++}$, $Ca^{++}$. Carboxylic acid salts of said polymer are generally those of sodium and potassium. It is thought the polyvalent positive ions form an electrostatic type of bond or bridge between cellulose and carboxy groups (or the salts of carbosyl) of the polymers.

The invention is further accomplished by a process of preparing modified cellulose comprising the steps of adding a polymeric organic product containing both amine groups and carboxylic acid groups to a wet pulp furnish; forming a sheet from the pulp furnish containing said amine-carboxylic acid polymer product; adding a high molecular weight epoxy resin emulsion to the sheet; and drying the sheet, thereby obtaining the modified cellulose. The products as well as the process are within the scope of the invention.

The reactants used in this invention may be described by the following major groups: the pulp starting material, the amine-carboxylic acid containing polymeric material, the epoxy resins and/or an organic diisocyanate.

The pulp materials used in the invention are those commonly produced on commercial scale from wood cellulose or from other sources of cellulose-yielding materials.

The polymeric product is derived from the polyacrylamide degradation product, or in its place, any polymeric material containing amine and carboxylic groups can be used. The alkylacrylamide monomer precursor of the polyacrylamide is derived from at least one alkylacrylamide of from 0 to 5 carbon atoms in the alkyl chain, such as amides of acrylic acid, alphamethacrylic acid, alpha-ethacrylic acid, etc., and the amide moiety is formed from ammonia (representative monomers are acrylamide, methacrylamide and ethylacrylamide).

As one of the amine-carboxylic acid-containing materials, the polyalkylacrylamide degradation product is prepared in the manner described in I. and E.C., Volume 48, No. 12, p. 1236 (December 1956). The product may be obtained by treating the various acrylamide polymers available. These polymers may be homopolymers of the same monomer species or they may be copolymers of different monomer species listed above. The basic consideration is the obtaining of carboxylic acid groups which, in their salt form, will react wtih the cellulose molecule as it is found in the paper furnish. The other basic consideration is the obtaining of free amino groups in the same molecule which are capable of reacting with the epoxy resin to produce the necessary chemical bridge giving enhanced properties to the cellulosic material or fiber-containing sheet. The preferred starting material is the polyacrylamide made from acrylamide monomers. The chemical reaction effecting the polyacrylamide conversion into suitable form is commonly referred to as Hofmann degradation and is accomplished by using either hypochlorite or hypobromite reagents. In place of the carbon backbone polymers containing carboxylic acid and amine groups other polymers may be used, such as silicone-containing polymers having carboxylic acid and amine groups.

The epoxy resins of interest are generally those that have a sufficiently long molecular distance between the epoxy moieties.

A general class of epoxy compounds adaptable in the present process contains terminal epoxy moieties sufficiently far apart whereby the rigidity of the short molecule or a more rigid molecule does not detract from the desired and balanced properties.

Other epoxy compounds may be best described by source and include commonly known resins sold under trademarks, such as the Epon series of resins made by Shell Chemical Corporation. The chemical structure of these resins can be represented by the following formula:

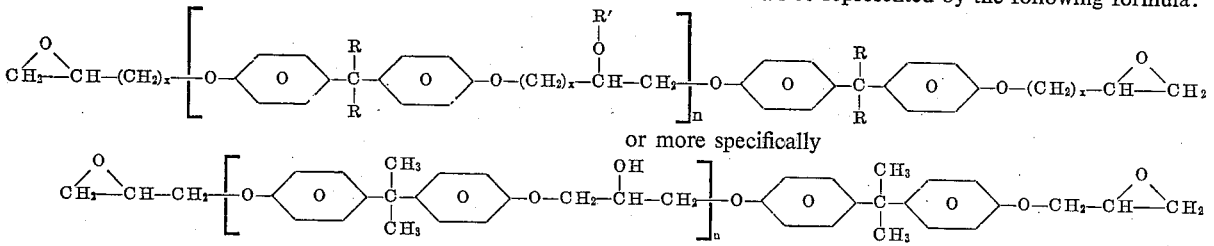

or more specifically

In the first formula above, R may be alkyl of from 1 to about 5 carbon atoms, R' may be H or alkyl of from 1 to 5 atoms; $x$ may be of from 1 to 4. The number "$n$" is related to the epoxy equivalent and is explained below.

The value of the epoxide equivalent is measured by the grams of resin containing one gram equivalent of epoxide. These values can vary from 140 to 4000, with preferred ranges of about 225 to 2000. Doubling the value of epoxy equivalent gives the approximate molecular weight. The particularly interesting subrange of epoxide equivalents is of from 300 to 1100, while the preferred group of species represents a range of from 450 to 525 epoxy equivalents with a molecular weight of from about 900 to about 1100 and a melting point of from about 64° C. to about 76° C. Epoxy resins based on the second formula and having the following gram equivalent ranges are designated as follows:

Resin A contains of from about 225 to about 290 gram equivalents per epoxy group;

Resin B contains of from about 300 to about 375 gram equivalents per epoxy group;

Resin C contains of from about 450 to about 525 gram equivalents per expoxy group;

Resin D contains of from about 870 to about 1025 gram equivalents per epoxy group;

Resin E contains of from about 1550 to about 2000 gram equivalents per epoxy group.

Furthermore, any difunctional epoxy compounds with the two epoxy groups sufficiently far apart (for present purposes, a distance of from about 5 to about 18 carbon atoms), may be employed. They are represented by the following formula:

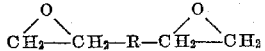

where R is of from 5 to about 24 carbon atoms and may be alkyl alkenyl, or branched alkyl. Aromatic compounds having terminal di-epoxy substituents are also useful. The preferred group of epoxy compounds, through, are those represented previously as resins A to E.

In place of the epoxy resin, diisocyanates can be used with the PAM amine (carboxylic acid and amine derived from polyacrylamide). The diisocyanate consists of an aliphatic diisocyanate having a distance between the two diisocyanate moities equivalent from about 5 to 18 carbon atoms with the preferred distance from about 8 to about 12 carbon atoms. Representative diisocyanates are aliphatic diisocyanates of the hydrocarbon series of from about 8 to 18 carbon atoms.

The isocyanates are represented by the formulas:

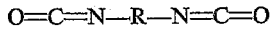

and

where R is an alkyl either straight chain or branched chain of from 5 to 18 carbon atoms in the main chain. The value of $n$ in the above formula is of from 8 to 18 with the preferred range 8 to 12.

As it was mentioned above, generally, emulsions of the epoxide are used in practicing the invention. Suitable emulsifiers are: Versamid 100, which is obtained from General Mills and is a reaction product of dimerized linoleic acid and a diamine. The product has a high molecular weight (up to 9000 M.W.). Tamol N is obtained from Rohm & Haas Chemical Company. Emulphor EL–719 is obtained from Antara Chemical Company and is a liquid non-ionic polyoxyethylated vegetable oil.

Examples of the procedures which illustrate the accomplished invention are given below. Unless otherwise indicated, the components are by weight.

EXAMPLE I

A pulp stock finish representative of the pulps commonly used in the paper industry and comprising predominantly southern kraft pulp was used to prepare handsheets. The pulp used had a solids content of 86%. Two liters of 3% pulp stock furnish were prepared by adding 70 grams of undried pulp, enough rosin in water to have a rosin content in the total solution of 1.5% (based on the dry weight of pulp), and papermaker's alum solution to have an alum content of 3% (based on pulp). The components were dispensed in a suitable pulp disintegrator which ran for 20 minutes. Handsheets were made by taking approximately 266 cc. of the pulp furnish per sheet.

EXAMPLE II

Two liters of a 3% pulp furnish suspension were made as described in Example I. A number of handsheets were prepared as follows:

(1) Two untreated sheets weighing 8.1 and 7.6 grams;
(2) Five handsheets were prepared by adding to the pulp furnish of each handsheet 100 ml. of a 5% HCl acidified and neutralized (with a pH from about 7.5 to 8) solution of a polyacrylamide degradation product. The sheets weighed about 9.3 grams and 9.9, 10.0, 9.2 and 8.3 grams respectively.

The above referred-to polyacrylamide degradation product was prepared as follows: An alkaline solution of sodium hypochlorite was prepared by adding the required amount (13.5 grams) of sodium hydroxide to 248 ml. of a 5.25% solution of sodium hypochlorite (13 grams NaOCl).

A 10% solution of polyacrylamide was added to the reaction mixture at room temperature. After 1 hour, the solution was adjusted to a pH of 8. No insoluble matter appeared in the orange-brown solution and 100 ml. of methylalcohol were added, bringing the volume to 450 ml. The solution was allowed to stand over night. One liter of methylalcohol was added in portions of 100 ml. which caused a gummy precipitate to separate. This product was recovered by filtration and a hard, white, gummy precipitate was left on the paper. It had a positive test for primary amine. The total amount recovered was 1.4 grams.

Following the same procedure as above, but using sodium hypobromite and ethyl alcohol as solvent in the Hofmann degradation of the polyacrylamide, 10.2 grams of the amine-containing degradation product were obtained. The solution used for treating the sheets was prepared by taking the amine-containing polyacrylamide degradation product and acidifying it with 6 N HCl to reduce its pH from 8 to about 5.5, and neutralizing to a pH of about 7.5 with 10% sodium hydroxide.

EXAMPLE III

The above handsheets were treated with the following epoxy emulsion prepared as outlined below. Epoxy resin A emulsion was prepared as follows. Into a blender, 120 grams of methyl isobutyl ketone and 180 grams of epoxy resin A were introduced. The components were mixed and an emulsifying agent, Emulphor EL–719 (previously described), was added. To this solution, 100 ml. of water were added until inversion occurred; then an additional 180 ml. of water were added. The final emulsion was ready for use in preparing the sheets as outlined above.

An emulsion of epoxy resin C was prepared as follows. To 240 grams of resin C (75% solids in 1:1 mixture of methyl ethyl ketone and toluene) were added 60 grams of toluene. Fourteen grams of Tamol N (previously described), dissolved in 269 grams of water, were added slowly to resin C in a blender. After the emulsion inverted, 300 grams of water containing 17 grams of clay were added. The emulsion was ready for use as outlined above.

In another embodiment, the epoxy resin was prepared as follows. To 240 grams of resin C (75% solids in 1:1 mixture of methyl ethyl ketone and toluene), 60 grams of toluene were added; the solution was agitated, and 21 grams of Emulphor EL–719 were added. Water was introduced slowly into the emulsion until the emulsion inverted. Enough water was used to make a total of 267 grams of the emulsion. Finally, 12 grams of predispersed clay were added, giving a total of 2% clay (based on total solids). In place of toluene, methyl isobutyl ketone may be used, or a mixture of methyl isobutyl ketone and toluene.

In a further embodiment, the epoxy resin D was prepared as follows, 210 grams of dry resin D, 200 grams of 1:1 mixture of toluene and methyl isobutyl ketone were introduced into a blender. To the mixed components, 21 grams of an emulsifying agent and 255 grams of water were added. Further, 14 grams of clay were blended into the emulsion. The final emulsion contained 30% epoxy resin and 2% of clay.

The PAM amine resin, prepared as described before, was added to the sheet at the wet end. The resin was added after the sheet had been dried and cooled and then soaked for 2 minutes in one of the above epoxy solutions. After the soaking, the sheets were run through a squeezing press in the form of a sizing press (which can be run hot or cold), dried for 10 minutes at 110° C., cooled and reweighed.

The treated sheets added the following amounts of resin as given in Table I below. The original sheets were trimmed in some instances.

Table I
AMOUNT OF EPOXY RESIN ADDED TO THE SHEET

| Sheet No. | Original Weight of Sheet+PAM Amine (grm.) | Type of Resin Used | Amount of Resin Added to Sheet (Dry Basis) (grm.) |
|---|---|---|---|
| 1 | 7.9 | D | 2.2 |
| 2 | 8.8 | A | 3.7 |
| 3 | 8.3 | C | 2.2 |
| 4 | 7.3 | D | 3.3 |

The sheets obtained according to the procedure outlined in Example III had the following properties.

Table II
PHYSICAL PROPERTIES OF HANDSHEETS MADE FROM A TYPICAL PULP STOCK FURNISH WITH PAM AMINE WET END ADDITIVE AND VARIOUS EPOXY RESINS

| Wet End Additive | Resin | Lbs. Mullen | Elmendorf, Grams | Dry Tensile Lbs. | Wet Tensile Lbs. |
|---|---|---|---|---|---|
| Untreated | Untreated | 26 | 11 | 12 | 0.4 |
| None | A | 15 | 24 | 6 | 0.2 |
| None | C | 55 | 34 | 20 | 0.3 |
| None | D | 100 | 29 | 27 | 0.9 |
| PAM amine (Sheet #1) | D | 79 | 23 | 25 | 5.5 |
| PAM amine (Sheet #2) | A | 46 | 35 | 15.5 | 4.0 |
| PAM amine (Sheet #3) | C | 60 | 31 | 24 | 4.4 |
| PAM amine (Sheet #4) | D | 56 | 24 | 30.5 | 6.6 |

The Mullen test referred to above was carried out according to TAPPI-T403M-44 standard.

Elmendorf test is a standard test in the paper art and the procedure for carrying it out is given in TAPPI-T414M-49.

An Elmendorf number of 11 grams indicates satisfactory performance; an Elmendorf number of 18 grams indicates good performance; and an Elmendorf number of 25 grams indicates superior performance.

Elmendorf test is general shows the tear resistance of paper stock. It further shows that as the Mullen and tensile strengths increase, the force necessary to tear a sheet will markedly decrease. (Elmendorf tear strength will decrease.) Quite contrary to the previous knowledge, in the present case, the tear strength does not decrease, or if it does, it will decrease very slightly.

The tensile strength measurement of the paper is carried out under wet and dry conditions. It indicates the ability of the fibers to bond to each other in a parallel plane. Dry Tensile numbers of 12, 18, and 25 indicate satisfactory, good and superior properties, respectively. Any increase of wet strength numbers or values over untreated tensile values indicates improvement in wet strength; the significance is the kind of increase in value. Anything over the previous value, such as, by one number, is significant. Further, the wet tensile number signifies that a chemical cross-linking has occurred supplementing the hydrogen bonding of cellulose.

The tests of these properties were carried out according to TAPPI methods designated for dry tensile as T404M-50 and wet tensile as T456M-49.

As seen from the above tables, the compared results show the actual values of the improved properties.

What I claim is:

1. A process for producing modified cellulose comprising the steps of:
   (a) adding a polymethacrylamide degradation product to a pulp furnish;
   (b) forming a sheet from the pulp furnish;
   (c) adding an epoxy resin emulsion to the formed wet sheet wherein the epoxy resin is characterized by the formula:

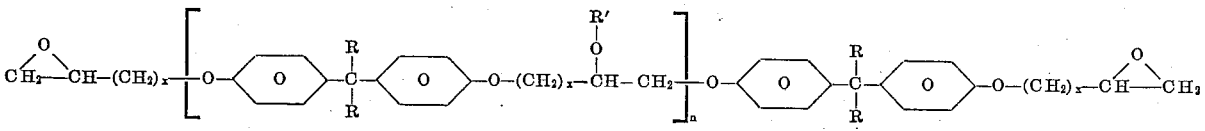

wherein R is alkyl from 1 to 5 carbon atoms, R' is selected from the group consisting of alkyl of from 1 to 5 carbon atoms and hydrogen, $x$ is from 1 to 4 wherein $n$ represents the number of grams containing 1 gram equivalent of epoxy and is of from 140 to 4000, and
   (d) drying the wet sheet, thereby obtaining the modified cellulose.

2. A process for preparing modified cellulose comprising the steps of:
   (a) adding a polyalkylacrylamide degradation product to a pulp furnish;
   (b) forming a sheet from the pulp furnish;
   (c) adding an epoxy resin emulsion to the sheet, said resin having an epoxy gram equivalent in the range of from 225 to 2000;
   (d) drying the sheet, thereby forming a modified cellulose material.

3. A process for preparing modified cellulose comprising the steps of:
   (a) adding a polyalkylacrylamide degradation product to a pulp furnish wherein the alkylacrylamide monomer precursor of the polyacrylamide is derived from at least one member of the group consisting of acrylamide and alkyl acrylamide of from 1 to 5 carbon atoms in the alkyl chain and wherein the amide moiety is formed from ammonia;
   (b) forming a sheet from the pulp furnish;

(c) adding an epoxy resin emulsion to the sheet, said resin having an epoxy gram equivalent in the range of from 225 to 2000;

(d) drying the sheet, thereby forming the modified cellulose.

4. A process for preparing modified cellulose comprising the steps of:
(a) adding a polymethacrylamide degradation product neutralized with sodium hydroxide to a pulp furnish containing papermaker's alum;
(b) forming a sheet from the pulp furnish;

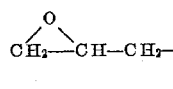

(c) adding an epoxy resin to the sheet, said resin having an epoxy gram equivalent in the range of from 225 to 2000; and
(d) drying the sheet, thereby forming the modified cellulose.

5. A modified paper product having included therein in a reacted form with cellulosic fibers a reaction product

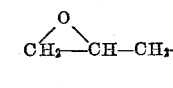

of a polyalkylacrylamide degradation product and an epoxy compound of the formula:

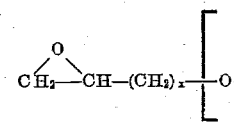

wherein $n$ represents the epoxide equivalent representing grams of pure resin containing 1 gram equivalent of epoxide and is of from about 140 to about 4000, R is selected from the group consisting of alkyl of from 1 to 5 carbon atoms, R' is selected from the group consisting of hydrogen and alkyl of 1 to 5 carbon atoms, and $x$ is from 1 to 4.

6. A modified paper product having incorporated therein in a reacted form with cellulose fibers a polymethacrylamide degradation product and an epoxide compound of the formula:

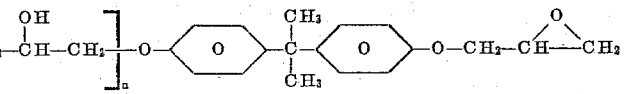

wherein $n$ is the epoxide equivalent based on grams of resin containing 1 gram equivalent of epoxide and is of from about 450 to 525.

7. A modified paper product having included therein, in a reacted form with cellulose fibers, a polyacrylamide Hofmann degradation product and an epoxy compound of the formula:

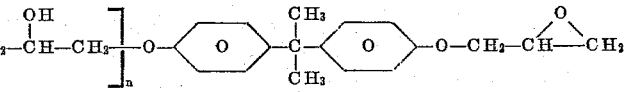

wherein $n$ is epoxide equivalent based on grams of dry resin and is of from about 300 to 1100.

References Cited by the Examiner

UNITED STATES PATENTS

| | | | |
|---|---|---|---|
| 2,729,560 | 1/1956 | House et al. | 162—168 |
| 2,890,978 | 6/1959 | Woodberry et al. | 162—168 |
| 2,913,356 | 11/1959 | Schroeder | 162—164 |
| 3,019,076 | 1/1962 | Pardo et al. | |
| 3,109,769 | 11/1963 | Martin | 162—164 |

DONALL H. SYLVESTER, *Primary Examiner.*

MORRIS O. WOLK, *Examiner.*

S. LEON BASHORE, *Assistant Examiner.*